United States Patent [19]

Wilson

[11] 4,445,669

[45] May 1, 1984

[54] CABLE TENSIONING DEVICE

[75] Inventor: Richard C. Wilson, Champlin, Minn.

[73] Assignee: Consolidated Cable and Rigging, Inc., Miami, Fla.

[21] Appl. No.: 293,889

[22] Filed: Aug. 18, 1981

[51] Int. Cl.³ .................. B66D 3/02; B66D 1/34; B66D 3/14

[52] U.S. Cl. .................. 254/369; 74/142; 74/155; 242/118.61; 242/118.8; 242/125.1; 254/380

[58] Field of Search .............. 254/217, 218, 223, 369, 254/376, 380; 74/142, 150, 153, 154, 155, 162; 242/117, 118.6, 118.61, 118.8, 125.1

[56] References Cited

U.S. PATENT DOCUMENTS

| | | | |
|---|---|---|---|
| 501,897 | 7/1893 | Pendleton | 242/118.8 |
| 2,341,491 | 2/1944 | Tucker et al. | 242/118.8 |
| 2,848,987 | 8/1958 | Morden | 242/125.1 |
| 2,927,771 | 3/1960 | Clark | 74/155 |
| 3,724,816 | 4/1973 | Cain et al. | 254/369 |
| 3,985,342 | 10/1976 | Denman | 254/369 |
| 4,042,212 | 8/1977 | Rinio | 254/384 |
| 4,045,001 | 8/1977 | Harvey, Jr. | 254/369 |
| 4,199,134 | 4/1980 | Kerber et al. | 254/218 |

Primary Examiner—Billy S. Taylor
Attorney, Agent, or Firm—James R. Haller

[57] ABSTRACT

A cable tensioning device having a frame, a cable-winding drum carried in the frame, ratchet wheel means attached to the drum, a reciprocable handle bearing a driving pawl for advancing the ratchet wheel means, and a holding pawl normally limiting rotation of the drum to a single direction. The ratchet wheel means may comprise a pair of toothed ratchet wheels respectively spaced on either side of the drum, and engageable with a driving pawl having similarly spaced teeth to provide symmetrical driving of the drum. Cable releasing means are shown permitting controlled unwinding of cable from the drum and comprising first spring means urging the holding pawl in toothed engagement with the ratchet wheel means, second preloaded spring means carried by the holding pawl, and index means responsive to movement of the handle to move the second spring means against its preload and thereby to disengage the holding pawl from the ratchet wheel means when the pressure between teeth of the holding pawl and ratchet wheel means is relieved. Details of construction are provided to enable the device to be manufactured from relatively few parts. The cable-winding drum may be manufactured from a pair of stamped plates, each plate having a generally semi-cylindrical shape forming approximately one-half of the cylindrical periphery of the drum, and edges of the plates being rigidly attached to ratchet wheels on either side of the drum.

7 Claims, 21 Drawing Figures

CABLE TENSIONING DEVICE

TECHNICAL FIELD

The invention relates to devices colloquially known as "come-alongs" that are employed to wind cable under tension upon a drum. The devices may be used as pulling devices, as for pulling automobiles out of ditches, as hoists as for lifting automobile engines upwardly from engine housings, and the like.

BACKGROUND ART

Various portable cable tensioning devices are now commercially available. One such device is described in U.S. Pat. No. 3,985,342. This device includes a frame, a cable-winding drum, a ratchet wheel at one side of the drum, and a crank or handle. Toothed driving and holding pawls are employed to selectively engage the ratchet wheel and cause the latter to turn as the handle is reciprocated. The device is manufactured by a process involving the assembly of a large variety of separately manufactured parts. Because the ratchet wheel is at one side of the drum, operation of the device under heavy loads may tend to twist or otherwise distort the device.

DISCLOSURE OF THE INVENTION

The present invention involves a cable tensioning device that employs relatively few parts, can be assembled without substantial welding, and which provides symmetrical, uniform loading of the cable drum as the device is operated. In one embodiment, the device comprises an open frame means, a rotatable, cable-winding drum carried in the frame means, ratchet wheel means coaxially attached to and rotatable with the drum on either side thereof, holding pawl means in operative association with the ratchet wheel for normally limiting rotation of the wheel to a single direction, and a reciprocable handle including driving pawl means for driving the drum in the single direction as the handle is reciprocated. The ratchet wheel means comprises a pair of toothed ratchet wheels carried adjacent respective ends of the cable-winding drum, and the driving pawl means includes sets of at least two teeth simultaneously engageable respectively with at least two teeth of each ratchet wheel, whereby the drum is driven from both ends in a uniform, symmetrical, non-twisting manner.

In another embodiment, the open frame means of the device includes generally coextensive, generally parallel rigid strap lengths each having generally parallel edges and having attachment means along the edges adjacent but spaced equally from coextensive ends of the strap lengths. Cable guide means comprising an apertured, rigid plate having attachment means at opposed ends thereof is attached between the strap lengths to the attachment means thereof to prevent movement of the apertured plate longitudinally of the strap lengths and to maintain spacing between the strap lengths.

In a further embodiment, the ratchet wheels are provided with apertures through their thicknesses, and the drum has a generally cylindrical periphery with aperture-fitting projections extending outwardly of the periphery and through the apertures in the ratchet wheels to rotatably lock the drum to and between the ratchet wheels. The drum includes two substantially identical semi-cylindrical plates each forming approximately one-half of the cylindrical periphery of the drum.

In yet a further embodiment, the drum includes interior lock means having interior, annular surfaces oriented at an acute angle to one another, the drum having an opening to its cylindrical periphery for reception of a cable end interiorly of the drum in wedging engagement with and between the angled, annular surfaces to lock a cable end to the drum.

In a further embodiment, the cable tensioning device includes cable releasing means for permitting controlled unwinding of cable from the drum, comprising first spring means urging the holding pawl into toothed engagement with teeth of the ratchet wheels, second preloaded spring means carried by the holding pawl and movable against its preload to urge the holding pawl away from toothed engagement with teeth of the ratchet wheel means with a force greater than that of the first spring means without requiring movement of the holding pawl, index means responsive to movement of the handle in one direction to move said second spring means against its preload, whereby, upon relief of pressure between teeth of the holding pawl and teeth of the ratchet wheels, said second spring means forces the holding pawl out of toothed engagement with the ratchet wheel.

Other and further embodiments of the invention will become evident from the following description.

BEST MODE FOR CARRYING OUT THE INVENTION

Figure 1:
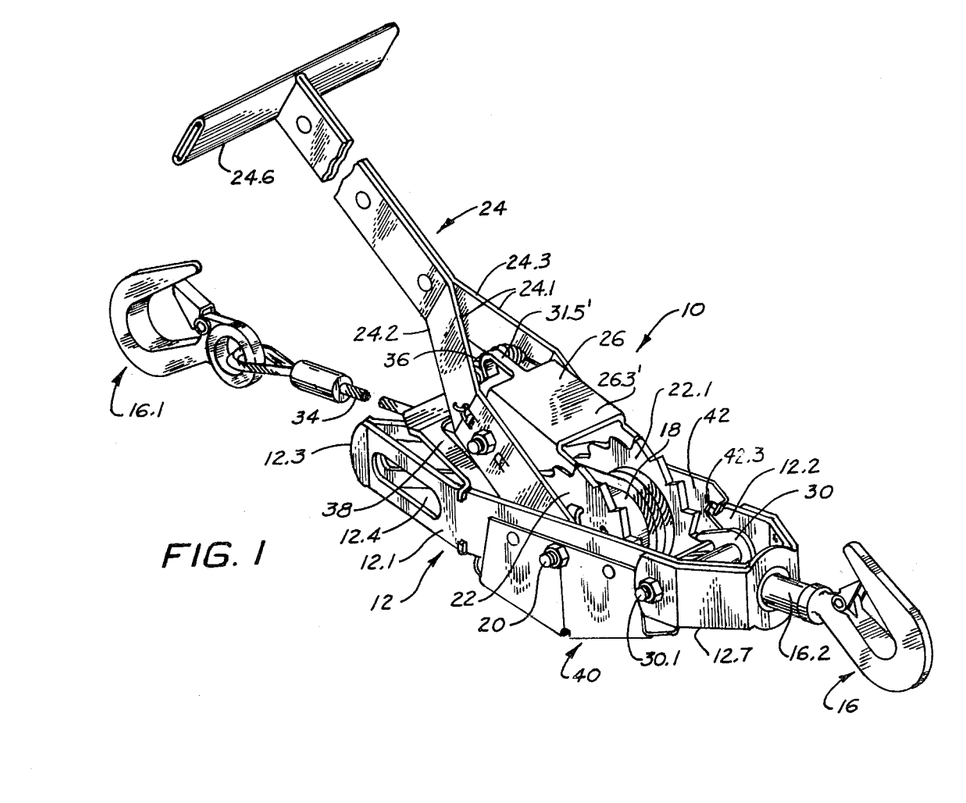
FIG. 1 is a broken-away, perspective view of the cable tensioning device of the invention.

Referring first to FIG. 1, the cable tensioning device of the invention is designated generally as 10 and includes open frame means typified by the frame designated generally as (12). To one end of the frame is attached a swivel hook (16). A cable-winding drum (18) is positioned within the frame (12) and is supported on an axle (20). A pair of toothed ratchet wheels (22), (22.1) are carried by the drum (18) on either side thereof. Pivotally attached to the axle (20) is the bifurcated end (24.1) of a handle (24), the bifurcated end carrying a driving pawl (26) having teeth engaging the ratchet wheels (22), (22.1). A holding pawl is designated generally as (30) and is mounted to the frame (12), the holding pawl having teeth also engaging the toothed ratchet wheels (22), (22.1). A cable, designated generally as (34), is attached to and wound upon the drum (18) and extends in the opposite direction from the hook (16). The cable may be provided with a similar hook (16.1). Detent means, typified by the laterally extending spring (36), operates to releasably permit the driving pawl (26) to assume a position in engagement with or disengaged from the teeth of the ratchet wheels (22), (22.1).

The holding pawl (30), as will be noted from FIG. 1, is pivotally journaled to the frame (12) by means of an axle (30.1). A cable guide, typified by plate (38), extends from one side to the other of the open frame (12) to support the frame and to guide the cable (34) passing therethrough. A cover or housing (40) is provided beneath the cable-winding drum for functional and safety reasons.

Figures 2, 6:
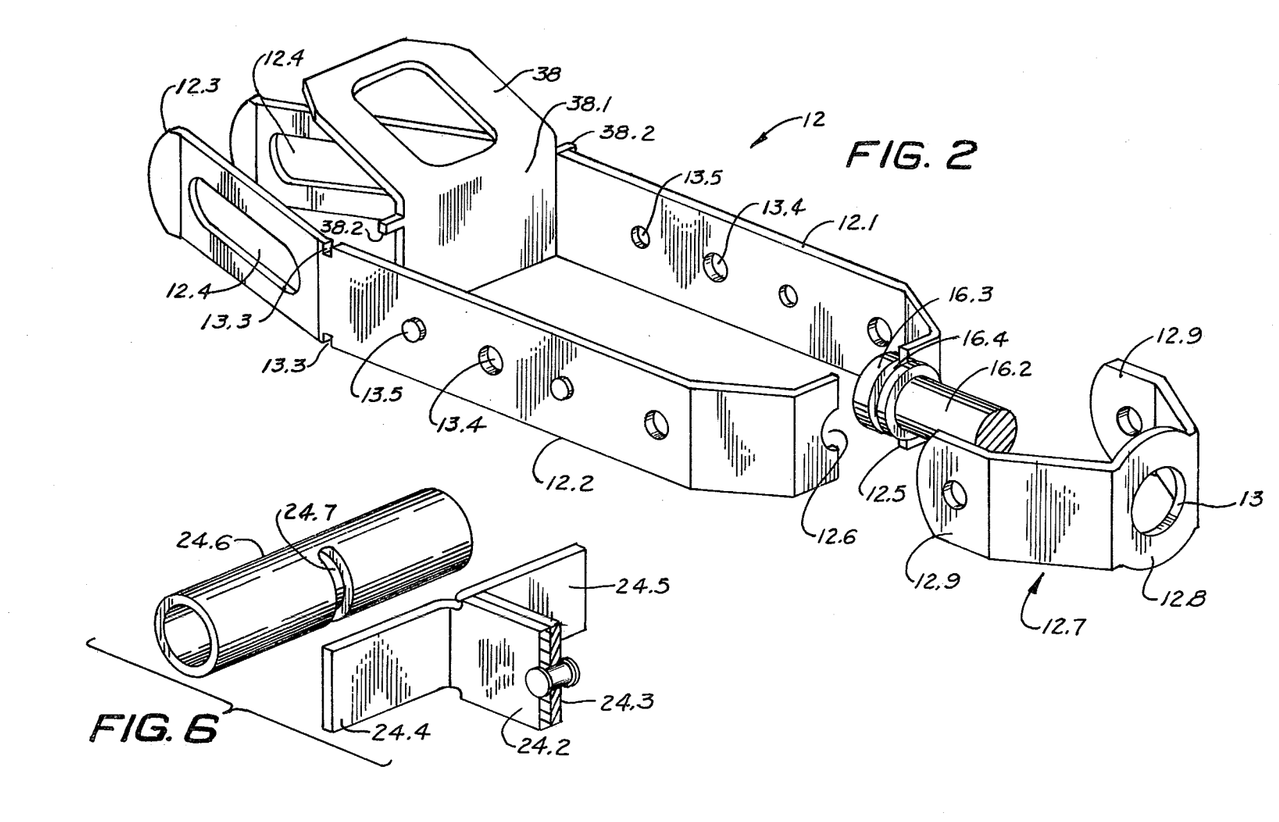
FIG. 2 is a perspective, broken-away view showing a frame employed in the device of FIG. 1.
FIG. 6 is a perspective, exploded, broken-away view of the end of a handle shown also in FIG. 1.

FIG. 2 depicts a frame useful with the device shown in FIG. 1. As depicted, the frame includes a pair of elongated metal straps (12.1), (12.2) which, it will be noted, are identically shaped. The straps converge at their rearward ends and the rearward end portions are provided with opposed, longitudinal slots (12.4) for purposes to be described below. The frame lengths (12.1, 12.2) converge inwardly at their forward ends, each end being provided with a semi-circular recess (12.6). A generally U-shaped plate (12.7) comprising a strap having an apertured, flat central portion (12.8) and arms (12.9) is formed to fit over the forward ends of the frame lengths (12.1), (12.2) with the aperture (13) aligned with the aperture formed by the adjacent semi-circular recesses (12.6). The hook (16) includes a shank (16.2) that terminates in a cylindrical head (16.3), the latter having an annular groove (16.4), and the semi-circular recesses (12.6) of the strap lengths are captured in the groove (16.4). The aperture (13) of the end strap (12.7) is sufficiently large as to slideably fit over the cylindrical head (16.3) of the hook shank. The hook shank is permitted to rotate or swivel within the aperture formed by the semi-circular ends (12.6) of the frame lengths (12.1, 12.2), and the rigidity of the semicircular ends (12.6) is reinforced by the surface-to-surface contact provided by the inner surface of the central apertured portion (12.8) of the end strap (12.7) against the semi-circular strap ends (12.5).

Figures 3, 4, 5:
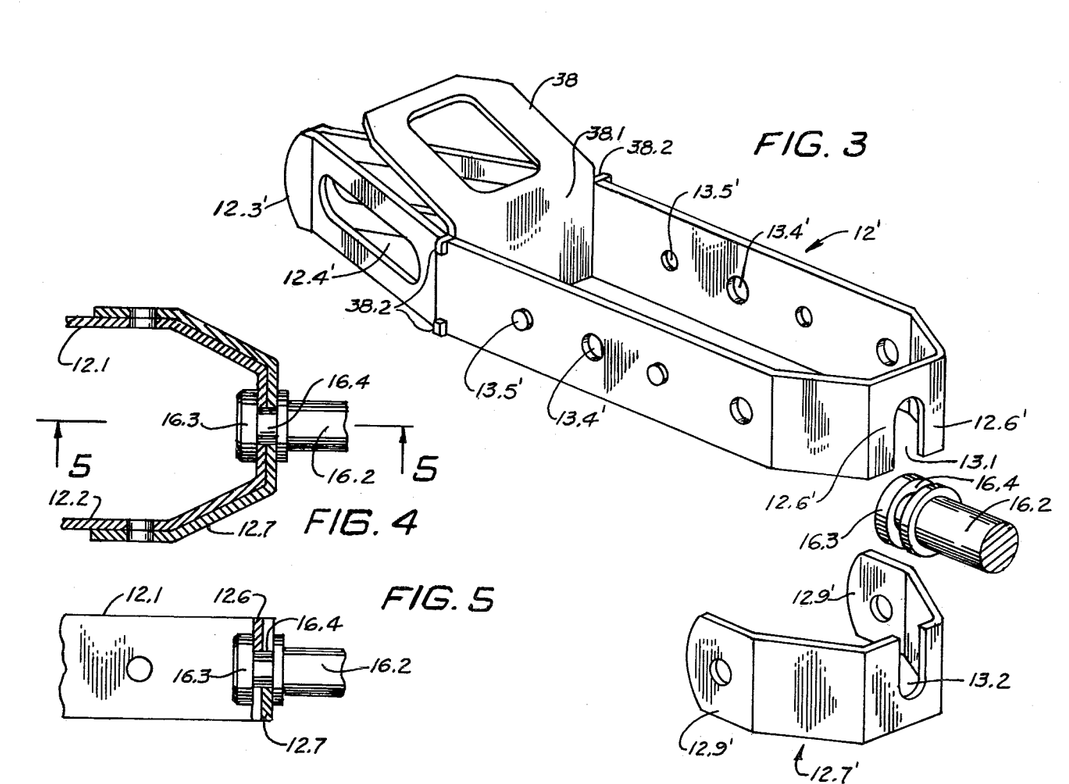
FIG. 3 is a perspective, exploded view of a modified frame.
FIG. 4 is a broken-away, cross-sectional view of the end of the assembled frame shown in FIG. 3.
FIG. 5 is a broken-away, cross-sectional view taken along line 5—5 of FIG. 4.

Referring now to FIG. 3, the frame there shown is largely identical to that shown in FIG. 2, and similar identifying numbers, shown primed, have been employed in the drawing. In this embodiment, however, the strap is formed from a single length of strapping material, the forward ends of the strap lengths (12.1'), (12.2') being provided with a generally U-shaped recess (13.1) sized to accommodate the groove (16.4) formed in the cylindrical end of the shank (16.2). The end strap (12.7') has a similar, although oppositely-facing, U-shaped recess (13.2) that also loosely accommodates the groove (16.4), as shown best in FIGS. 4 and 5. It should be noted that in the latter configuration, the annular groove as shown in FIGS. 4 and 5 is twice the width of the groove employed in the device of FIG. 2.

The cable guide (38) comprises a plate (38.1) extending between the parallel portions of the frame lengths (12.1), (12.2), the plate having spaced, outwardly projecting tabs (38.2) that are received within notches (13.3) formed in oppositely facing edges of the frame lengths (12.1, 12.2). In this manner, the abutment of the edges of the plate (38.1) with the confronting surfaces of the strap lengths maintain the spacing between strap lengths, and the engagement of the tabs (38.2) in the notches (13.3) locks the cable guide in position longitudinally of the strap lengths. The tabs desirable are bent inwardly, as shown best in FIG. 3.

Figure 9:
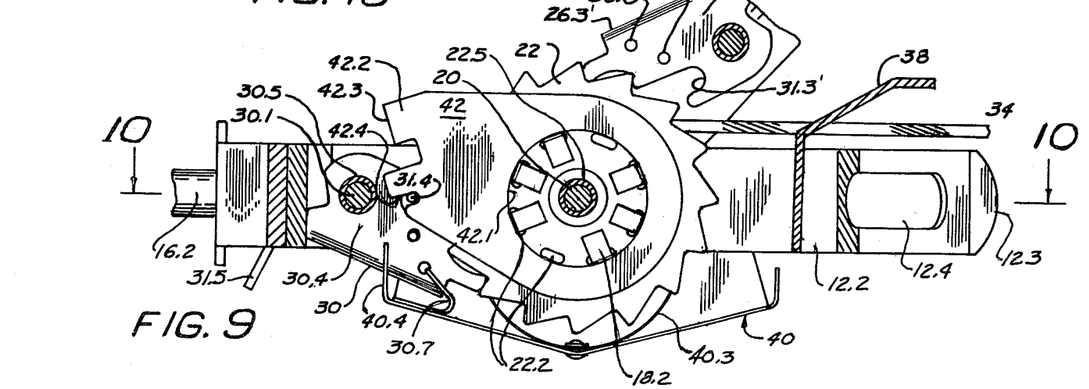
FIG. 9 is a broken-away, longitudinal cross-sectional view of the device of FIG. 1, taken along line 9—9 of FIG. 10.
Figures 11, 12, 13:
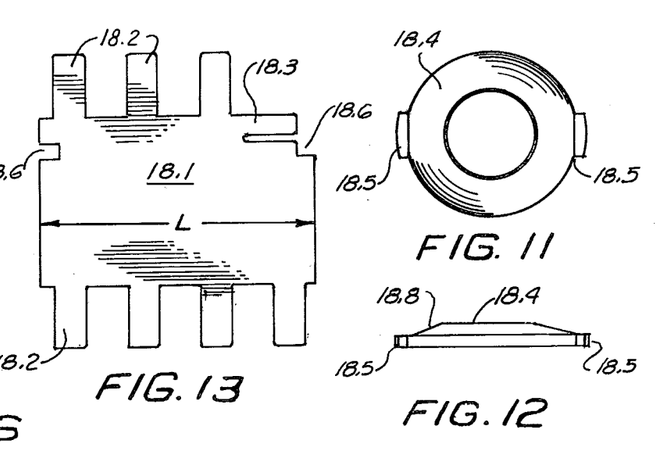
FIG. 11 is a plan view of a cable locking element.
FIG. 12 is a side view of the element shown in FIG. 11.
FIG. 13 is a plan view of a plate employed in forming the cable-winding drum, as shown also in FIGS. 9 and 10.
Figure 14:
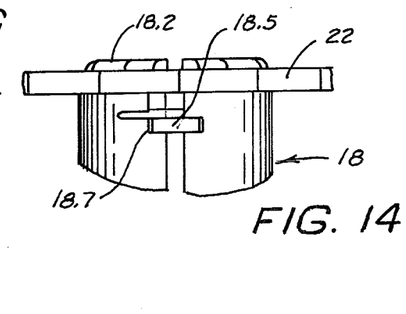
FIG. 14 is a broken-away view of a cable-winding drum employed in the device of the invention.
Figure 15:
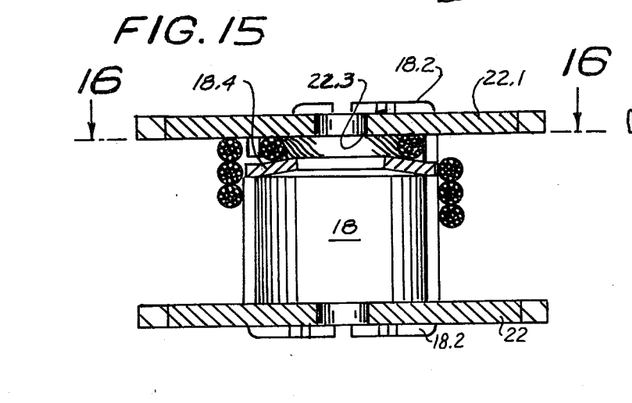
FIG. 15 is a cross-sectional, broken-away view showing the cable-winding drum with a cable wound thereon.
Figure 16:
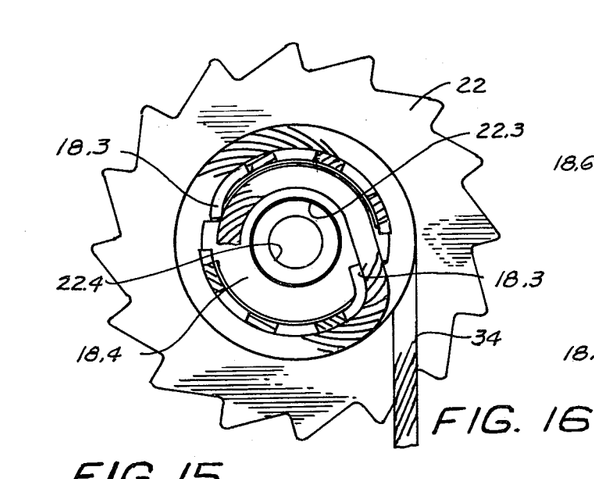
FIG. 16 is a broken-away, cross-sectional view taken generally along line 16—16 of FIG. 15.

Referring now to the cable drum, FIG. 13 is a diagramatic view of a plate employed in manufacture of the cable-winding drum (18). The plate, designated (18.1), has a length "L" approximating one-half of the circumference of the drum (18), and includes mounting tabs or projections (18.2) that extend perpendicularly from the length direction. The plate (18.1) may be manufactured by known stamping techniques, and then may be bent into a semi-cylindrical form with the tabs (18.2) extending parallel to the axis thereof. It may be noted that the plate (18.1) includes a cable-mounting tab (18.3) adjacent one of its edges, this tab, when bent, providing an opening in the cable-winding drum for admission of the end of a cable. The ratchet wheels, typified by ratchet wheel (22) in FIGS. 9 and 16, are formed desirably by a stamping procedure from heavy metal and are provided with a series of slots (22.2) formed on a circle having a common axis with the ratchet wheel and on a radius approximating the radius of the cable-winding drum (18). The mounting tabs (18.2) of the semi-cylindrical plates (18.1) are extended through the slots (22.2) in the ratchet wheels, and are then bent inwardly as shown best in FIG. 9 to firmly anchor the ratchet wheels to the cable-winding drum (18). In this manner, the two semi-cylindrical plates (18.1) forming the cable-winding drum are maintained in a precise orientation with respect to one another to form the cylindrical periphery of the drum, and the ratchet wheels, (22, 22.1) are rigidly held in spaced-apart, parallel positions at either side of the peripheral drum surface.

Referring to FIGS. 11, 12, 14 and 15, a dished disc (18.4) having a diameter slightly less than the inner diameter of the cable-winding drum (18) is provided with opposed tabs (18.5). As shown in FIG. 13, the abutting ends of the plates (18.1) are provided with notches (18.6) which, when the opposed plates (18.1) are brought together to form the drum, provide elongated slots shown at (18.7) in FIG. 14. The tabs (18.5) of the disc (18.4) are received in the slots (18.7) on opposed sides of the cable-winding drum, thereby mounting the disc (18.4) within the drum. The convex surface (18.8)

of the disc faces the confronting surface (22.3) of the ratchet wheel (22.1), and forms an acute angle therewith. One of the tabs (18.3) of the plate (18.1) is bent inwardly as shown best in FIG. 16 to provide an opening through which is received the end of a cable (34), the cable end becoming wedged between the surfaces (18.8) and (22.3). The cable-mounting tab of the other plate (18.1) forming the drum also is bent inwardly, as shown best in FIG. 16, to hold the cable and securely wedged between the surfaces (18.8) and (22.3) to rigidly and firmly lock the cable end within the drum.

In the preferred embodiment, the cable-winding drum plates (18.1), each forming approximately one-half of the cylindrical drum surface, are identical with one another, and the ratchet wheels (22), (22.1) similarly are identically formed.

Figures 7, 8, 8A:
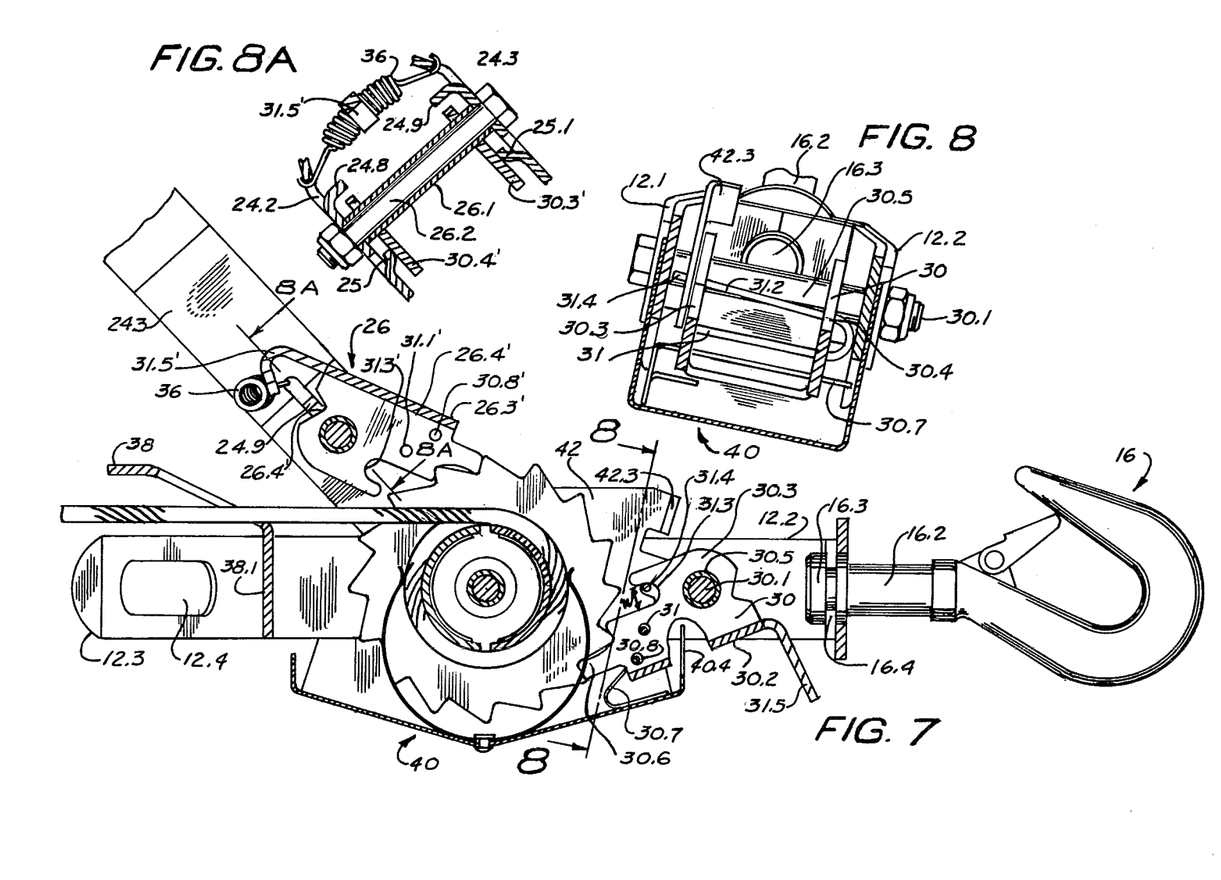
FIG. 7 is a longitudinal, broken-away, cross-sectional view of the device of FIG. 1.
FIG. 8 is a broken-away, cross-sectional view taken along line 8—8 of FIG. 7.
FIG. 8A is a broken-away, cross-sectional view taken along line 8A of FIG. 7.

The ratchet wheels (22), (22.1) have central orifices (22.4) (FIG. 15) within which is slideably mounted a bushing (22.5) mounted upon an axle (20) (FIG. 7). The latter may take the form of a bolt passing through aligned holes (13.4) in the frame lengths (12.1, 12.2) and through the bushing (22.5). The ends of the bushing abut inner confronting surfaces of the frame lengths (12.1, 12.2) and space the frame lengths apart the appropriate distance so that the ratchet wheels turn readily within the frame. Spacers (22.6), (22.7), best shown in FIG. 10, center the drum (18) between the handle ends (24.2), (24.3). The ratchet wheels, as noted, are provided with teeth sloping preferentially in one direction in a known fashion.

Figure 20:
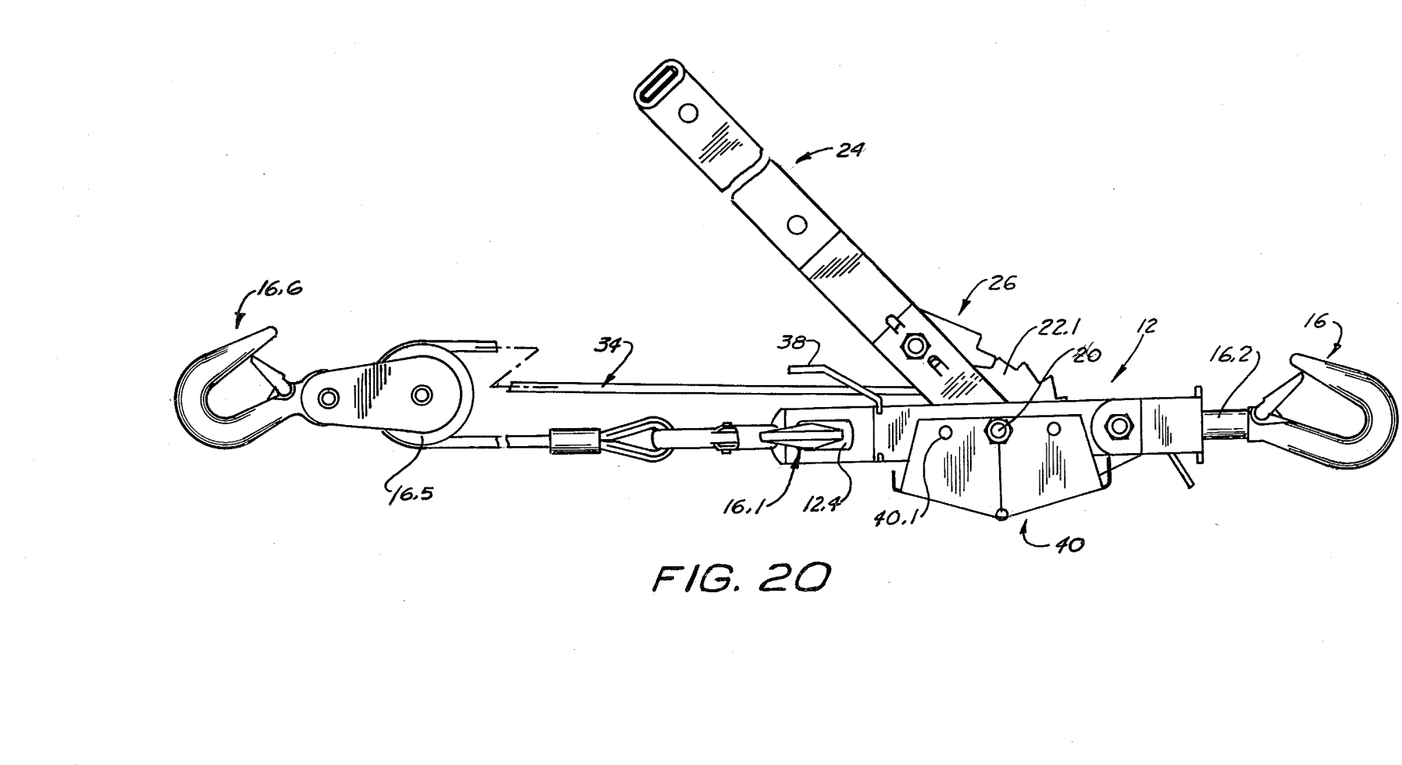
FIG. 20 is a broken-away, side view of a device of the invention showing a variation in the manner of its use.

The housing (40) is shaped from an appropriately stamped and bent metal plate, as shown best in FIGS. 1, 9 and 20, and is held to the frame by the bolt forming the axle (20). The frame lengths (12.1, 12.2) are coined outwardly as shown at (13.5) in FIGS. 2 and 3, and the coined out portions are received in orifices (40.1) of the housing (40) to further support the housing with respect to the frame. A generally circular strap of spring steel or other material, (40.2) (shown best in FIG. 7) is mounted centrally to the housing with the arms (40.3) of the strap extending along either side of the periphery of the cable-winding drum. The springy nature of the arms holds the cable that is wound on the drum tightly against the cylindrical periphery of the drum and retards any unintentional rotation of the drum or cable.

Referring now primarily to FIGS. 7-10, the holding pawl (30) desirably is formed from a metal plate that is generally U-shaped in cross-section, the plate having a floor (30.2) from the ends of which extend parallel side walls (30.3, 30.4). The side walls are journaled to receive a bushing (30.5), the ends of which abut confronting inner surfaces of the frame lengths (12.1, 12.2). An axle (30.1), typified as a bolt in the drawings, extends through the bushings and is supported at either side of the frame lengths (12.1, 12.2) by a bolt head and nut. As thus described, the holding pawl can freely rotate about its axis. The holding pawl is axially located by tabs (40.4), (40.5) extending upwardly from the housing (40) on either side of the pawl.

The side walls (30.3, 30.4) of the holding pawl are provided with outwardly extending teeth (30.6) shaped to engage the teeth (22.5) of the ratchet wheels. It will be noted that the side walls (30.3, 30.4) of the holding pawl are spaced apart the same distance as, and are aligned with, the ratchet wheels. Each side wall of the holding pawl (30) includes a pair of teeth that simultaneously engage sequential teeth of the ratchet wheels; that is, when the holding pawl is in toothed engagement with the ratchet wheels, two teeth arising from each side wall of the holding pawl are in contact with two teeth of each respective ratchet wheel. As will be evident from the drawing, the ratchet wheels are so mounted with respect to one another as to have their respective teeth in alignment, and the pair of teeth arising from the side walls of the holding pawl similarly are aligned.

A spring (30.7) (formed from an appropriate length of spring steel wire, desirably) seats on an inner surface of the housing (40) as shown in FIGS. 7 and 8 and extends upwardly and then laterally through small apertures (30.8) formed in the opposed side walls (30.3, 30.4) of the holding pawl, the length of the spring (30.7) extending laterally of the device through both such apertures and being so loaded as to urge the pawl torsionally into toothed engagement with the ratchet wheel (clockwise in FIGS. 7 and 17-19). A generally U-shaped spring (30.9) (FIG. 8) has a first leg (31) extending between and through aligned apertures (31.1) formed in the side walls (30.3, 30.4) of the holding pawl. The second leg (31.2) also extends between another aperture and an aligned, opposed slot formed in the respective side walls (30.3, 30.4), the aperture nearest the bend in the U-shaped spring being substantially equal in diameter to the aperture (31.1), and the opposed slot (31.3) having a width "W" substantially larger than the diameter of the spring—preferably at least three times as large. The spring arm (31.2) extends through the slot (31.3) and protrudes outwardly from that slot a short distance as shown in FIG. 8. As will be explained further below, the spring (30.9) is preloaded; that is, it is so set that its legs (31, 31.2) are urged to separate under spring pressure; the spring (30.9) has utility during the tension releasing procedure only.

Referring to FIGS. 1 and 6, the handle (24) is desirably formed of identical metal straps (24.2), (24.3) that are riveted or otherwise connected together along a portion of their length and which have distal ends (24.4), (24.5) that are bent outwardly at approximate right angles from the length of the handle. That portion of the handle that is riveted or otherwise connected together is herein termed the shank. A flexible length of tubing, made of rubber or other resilient plastic material, is designated generally as (24.6) and is provided with a slot midway along its length, the slot extending for approximately one-half of the circumference of the tube. During fabrication, the ends (24.4), (24.5) are inserted within the slot (24.7) such that when the ends are then brought together to form the shank, the tubing on either side of the slot (24.7) sheaths the ends (24.4), (24.5) with the shank of the handle extending outwardly of the slot. The wide handle end thus formed precluded the dangerous and damaging use of a pipe fitted over the handle to gain added leverage.

Figure 17:
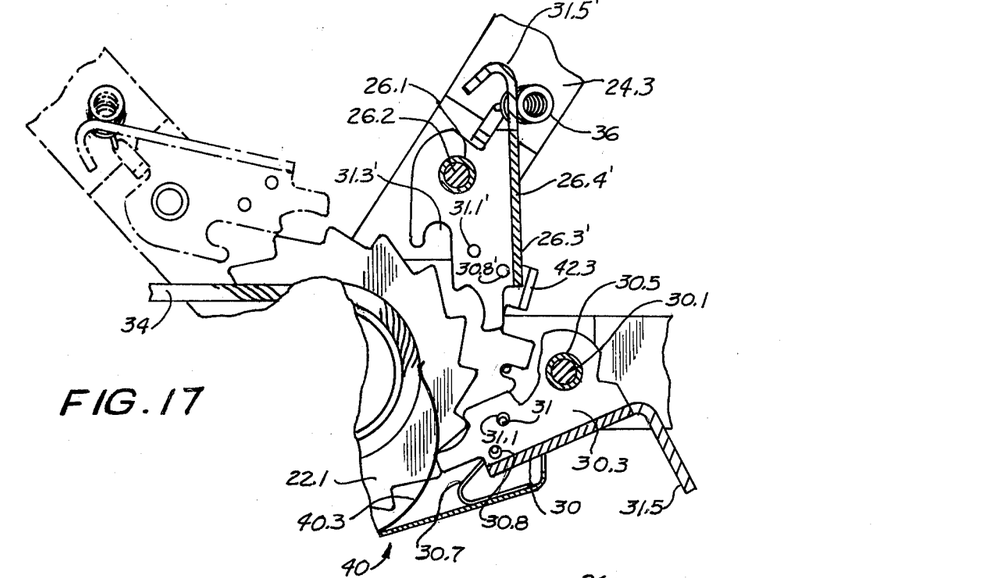
FIG. 17 is a schematic, broken-away, cross-sectional view showing one step in the operation of the cable-tensioning device of the invention.

The proximal ends of the strap are separated, as shown in FIG. 1, to provide the handle with a bifurcated end, the ends of the straps being apertured to receive the axle (20), the handle thereby being pivotally coupled to the frame (12). Between the bifurcated ends of the handle is mounted the driving pawl (26), the latter being, desirably, formed from the same metal stamping as is the holding pawl (30). Each of the driving and holding pawls has a projection (31.5), (31.5') respectively extending from its floor portion. For ease of description, similar identifying numbers are employed for the driving pawl (26) as have been employed with the holding pawl (30), except that the identifying numerals for the driving pawl are primed. The side walls (30.3), (30.4) of the driving pawl similarly are apertured to receive a bushing (26.1) pivotally mounting the driving pawl to an axle (26.2) typified in the drawing as a bolt passing through the bifurcated ends of the straps (24.2), (24.3) of the handle, as best shown in FIGS. 7 and 8A, the inward projections (25), (25.1) centering the pawl between the side members (24.2), (24.3). The projection (31.5′) is bent over in a smooth curve, as shown in FIGS. 8A and 17–19. A helical tension spring (36) extends between the bifurcated ends of the handle with the ends of the spring passing through small openings formed in the straps (24.2, 24.3). The spring is aligned with the projection (31.5′) so that the spring may assume a first position (shown in FIG. 8) bearing clockwise against the projection (31.5′) to force the teeth of the driving pawl (26) into engagement with the teeth of the ratchet wheels. Rotation in the counterclockwise direction (FIG. 7) is limited by engagement of inwardly directed tabs (24.8), (24.9) with the walls of notches (26.4′) formed in the driving pawl side walls (30.3′), (30.4′), respectively. In its other position, as depicted in FIG. 17, the spring bears in a counterclockwise direction against the projection (31.5′) and thus serves to rotate the driving pawl (26) in a counterclockwise direction to disengage the teeth of the driving pawl from the teeth of the ratchet wheels. The spring (36) is stretched slightly between the straps (24.2, 24.3) so that the spring occupies preferred positions on one side or the other of the projection (31.5′). The spring may easily be moved from one side of the projection to the other by finger pressure depending upon the desired mode (pay out or pull-in) of operation.

Figure 10:
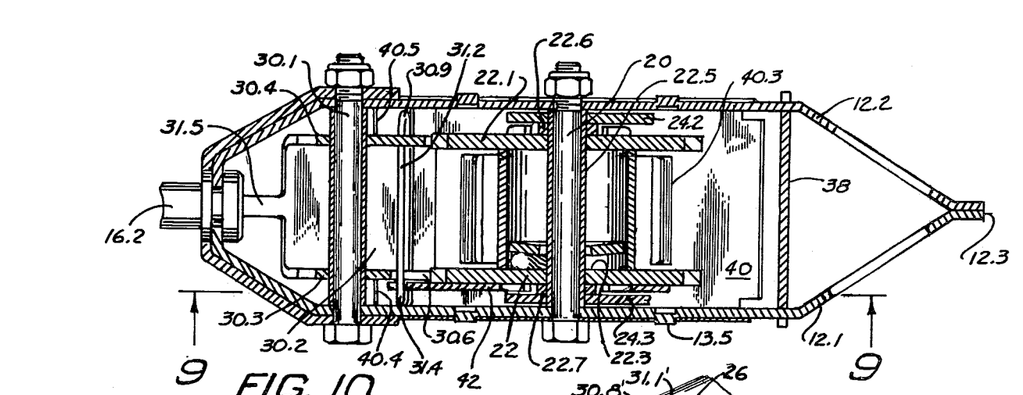
FIG. 10 is a broken-away, cross-sectional view taken along line 10—10 of FIG. 9.

Referring now particularly to FIG. 10, an index plate is shown generally at (42) and is provided with a central aperture (42.1) that pivotally engages the projections (18.2) of the cable-winding drum (18). The index plate extends from its pivot center and is provided at its forward end (42.2) with an inwardly-turned tab (42.3) (best shown in FIG. 8) that is cammingly engageable with the outer surface (26.3′) of the floor (26.4′) of the driving pawl when the latter is carried forwardly by movement of the handle (24). The index plate (42) also has a forwardly-facing slot (42.4) (FIG. 9) within which is seated the outwardly projecting end (31.4) of the U-shaped spring leg (31.2).

In operation, as when the hooks (16, 16.1) shown in FIG. 1 are attached to objects to be pulled together, the detent spring (36) is moved into the position shown in FIGS. 1 and 7, thereby bringing the teeth of the driving pawl (26) into engagement with teeth of the ratchet wheels. The teeth of the holding pawl (30) are urged into toothed contact with the ratchet wheels by means of the spring (30.7). As the handle (24) is cranked forwardly (clockwise in FIG. 7), the ratchet wheels are rotated forwardly as well, thereby winding cable upon the cable-winding drum. The teeth of the holding pawl prevent the ratchet wheels from turning in the other direction.

Figure 18:
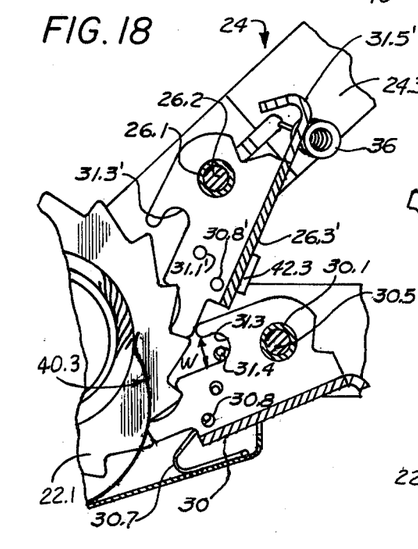
FIG. 18 is a view similar to that of FIG. 17 but showing another step in the operation of the device.
Figure 19:
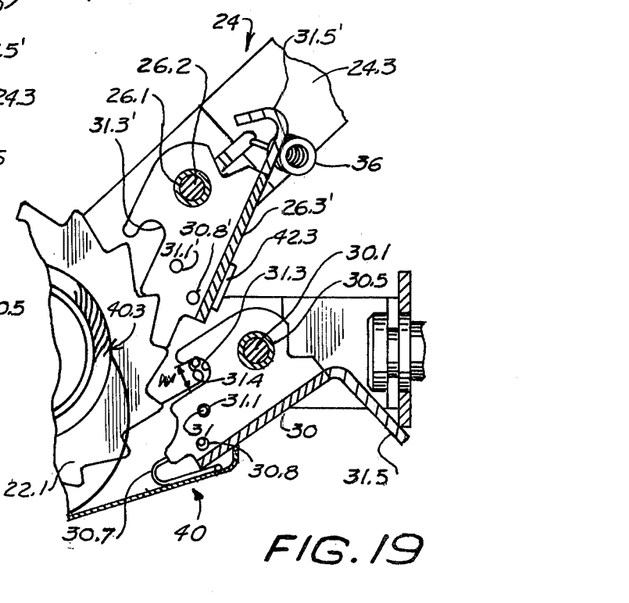
FIG. 19 is a view similar to FIGS. 17 and 18 but showing yet another step in operation of the device.

To relieve the tension on the cable, that is, to permit the cable-winding drum to unwind in a controlled manner, the detent spring (36) is moved into the position shown in FIGS. 17–19, thereby rotating the teeth of the driving pawl out of engagement with the ratchet wheels. As the handle is moved forwardly (clockwise) from the phantom line position to the solid line position shown in FIG. 17, the driving pawl encounters the camming tab (42.3) formed on the index plate. Upon further clockwise movement of the handle, the driving pawl is cammed into toothed engagement with the teeth of the ratchet wheels, as shown in FIG. 18, and, simultaneously, the index plate begins its clockwise motion, thereby forcing the U-shaped spring end downwardly within the wide slot (31.3) and thereby urging the holding pawl to move in a counterclockwise direction out of engagement with the ratchet wheels. The U-shaped spring is much stronger than the spring 30.7 but because of the tension of the cable and the corresponding forceful engagement of the teeth of the holding pawl with the teeth of the ratchet wheels, the holding pawl remains in toothed engagement with the ratchet wheel. As forward movement of the handle continues, the now fully engaged teeth of the driving pawl drive the ratchet wheels clockwise slightly, thereby releasing the pressure between the teeth of the ratchet wheels and those of the holding pawl, hereupon, under the pressure of the U-shaped spring, the holding pawl abruptly moves out of toothed engagement with the ratchet wheel. Movement of the handle now in the opposite or rearward direction under the cable load permits the ratchet wheels to turn in a counterclockwise direction from the position shown in FIG. 19. Such rearward motion of the handle, however, permits the index plate to move slightly in a counterclockwise direction, removing the pressure exerted by it upon the U-shaped spring end (31.2) which in turn enables the holding pawl to return to the position shown in FIGS. 7 and 17 under the influence of spring (30.7). As the handle is moved in a rearward or counterclockwise direction (FIG. 7), the driving pawl disengages from the camming tab (42.3) of the index plate, enabling the driving pawl to pivot counterclockwise under the influence of the detent spring (36), whereupon the procedure may be repeated. The holding pawl may be manually disengaged from the ratchet wheels by lifting the projection (31.5) to permit cable to be stripped rapidly from the drum.

As shown in FIG. 1, the cable (34) may be attached to a hook such as a snap-hook (16.1). With reference to FIG. 20, if further mechanical advantage is desired, the cable may be trained about a pulley (16.5) attached to an additional snap-hook (16.6), the cable thus being doubled back and the hook (16.1) being engaged in the slots (12.4) at the rearward end of the frame lengths (12.1, 12.2).

From the foregoing description, it will be understood that the cable tensioning device of the invention can be manufactured by a process involving stamping and forming, and welding of materials can be reduced or, preferably, eliminated entirely. Further, the number of stamped parts that are required are relatively few, since the generally symmetric construction of the device enables identical parts to be used on opposite sides of the device. For example, stampings for the handle straps may be identical, as may be the frame lengths (12.1), (12.2), the ratchet wheels (22) and (22.1), the driving and holding pawls (26) and (30) and the cable-winding drum plates (18.1). Further, the clean symmetry of the device avoids undue forces tending to twist or deform the device. The cable guide (38) not only serves to guide the cable run toward the hook (16.1), but also serves to rigidly space apart the frame lengths (12.1, 12.2) adjacent their rearward ends. The surface-to-surface contact afforded by the cable guide against interior, confronting surfaces of the frame lengths (12.1, 12.2) provide support for the frame lengths across their heights, and further prevents the frame lengths from twisting or distorting under heavy loads.

While a preferred embodiment of the present invention has been described, it should be understood that various changes, adaptations and modifications may be made therein without departing from the spirit of the invention and the scope of the appended claims.

What is claimed is:

1. A cable tensioning device comprising open frame means, a rotatable, cable-winding drum carried in the frame means, toothed ratchet wheel means coaxially attached to and rotatable with the drum, holding pawl means in operative association with the ratchet wheel means for normally limiting rotation of the ratchet wheel means to a single direction, and a reciprocable handle including a toothed driving pawl means engageable with teeth of the ratchet wheel means for driving the drum in the single direction as the handle is reciprocated, first spring means urging the holding pawl means into toothed engagement with the ratchet wheel means, second pre-loaded spring means carried by the holding pawl means and moveable against its preload to urge the holding pawl means away from toothed engagement with teeth of the ratchet wheel means with a force greater than that of the first spring means while the holding pawl means remains stationary, index means responsive to movement of the handle in one direction and including means carried thereby to cam the driving pawl means into toothed engagement with the ratchet wheel means prior to disengagement of the holding pawl means from the ratchet wheel means and responsive to continued movement of the handle in the one direction to move said second spring means against its preload, whereby upon relief of pressure between teeth of the holding pawl means and the ratchet wheel means, said second spring means forces the holding pawl out of toothed engagement with the ratchet wheel means.

2. The cable tensioning device of claim 1 wherein the holding pawl means comprises an integral, U-shaped plate substantially identical to the plate defining the drive pawl means and having at least tow teeth engageable with at least two teeth of each ratchet wheel.

3. A cable tensioning device comprising open frame means, a rotatable, cable-winding drum carried in the frame means, ratchet wheel means coaxially attached to and rotatable with the drum, holding pawl means in operative association with the ratchet wheel means for normally limiting rotation of the ratchet wheel means to a single direction, and a reciprocable handle including driving pawl means engageable with the ratchet wheel means for driving the drum in the single direction as the handle is reciprocated, the open frame means comprising generally coextensive, generally parallel rigid strap lengths each having generally parallel edges and having attachment means along said edges adjacent but spaced equally from coextensive ends of the strap lengths, and cable guide means comprising an apertured, rigid plate having attachment means at opposed ends thereof attached to the attachment means of the strap lengths to prevent movement of the plate longitudinally of the strap lengths and to maintain spacing between the strap lengths.

4. The cable tensioning device of claim 1 wherein the drum includes two substantially identical semi-cylindrical plates each forming approximately one-half of the cylindrical periphery of the drum.

5. The cable tensioning device of claim 4 in which at least one of the semi-cylindrical plates includes an aperture therethrough for reception of a cable end and further includes inwardly bendable tab means engageable with a cable end interiorly of the drum to anchor the cable end against escape from the drum.

6. A cable tensioning device comprising open frame means, a rotatable, cable-winding drum carried in the frame means, toothed ratchet wheel means coaxially attached to and rotatable with the drum, holding pawl means in operative association with the ratchet wheel means for normally limiting rotation of the ratchet wheel means to a single direction, and a reciprocable handle including a toothed driving pawl means engageable with teeth of the ratchet wheel means for driving the drum in the single direction as the handle is reciprocated, first spring means urging the holding pawl means into toothed engagement with the ratchet wheel means, second pre-loaded spring means carried by the holding pawl means and moveable against its preload to urge the holding pawl means away from toothed engagement with teeth of the ratchet wheel means with a force greater than that of the first spring means while the holding pawl means remains stationary, index means responsive to movement of the handle in one direction to move the driving pawl means into toothed engagement with the ratchet wheel means and responsive to continued movement of the handle in the one direction to move said second spring means against its preload, whereby, upon relief of pressure between teeth of the holding pawl means and the ratchet wheel means, said second spring means forces the holding pawl out of toothed engagement with the ratchet wheel means, said second spring means comprising a generally U-shaped spring having generally parallel legs, the holding pawl means having side walls with spring-receiving apertures therethrough, the legs of the spring extending through respective apertures, one such aperture being sized to permit significant movement therewithin of a spring leg extending therethrough, the index means including means receiving said spring end, whereby movement of the handle in one direction causes the index means to compress the U-shaped spring by movement of said one end within its aperture without movement of the holding pawl means.

7. A cable tensioning device comprising open frame means, a rotatable, cable-winding drum carried in the frame means, ratchet wheel means coaxially attached to and rotatable with the drum, holding pawl means in operative association with the ratchet wheel means for normally limiting rotation of the ratchet wheel means to a single direction, and a reciprocable handle including driving pawl means engageable with the ratchet wheel means for driving the drum in the single direction as the handle is reciprocated, the frame means including a continuous length of metal strapping defining generally parallel frame lengths converging in a forwardly facing segment and having one recessed slot formed in said forwardly facing segment thereof and open to an edge of said segment, and a second, separate strap segment overlying the first-mentioned strap segment and having a recessed slot therein overlying the slot of the first-mentioned segment to form a generally circular, forwardly open aperture, and hook means including a shank having an annular groove therein rotatably captured in said aperture.

* * * * *